United States Patent [19]

Wachowitz, Jr.

[11] 3,838,707

[45] Oct. 1, 1974

[54] VALVE WITH LEAK DETECTING SEAL AND DIAPHRAGM ASSEMBLY

[75] Inventor: Walter J. Wachowitz, Jr., Waukesha, Wis.

[73] Assignee: Alloy Products Corporation, Waukesha, Wis.

[22] Filed: Nov. 22, 1972

[21] Appl. No.: 308,752

[52] U.S. Cl. ............... 137/312, 137/327, 251/63.5, 251/335 A
[51] Int. Cl. ........................................... F16k 41/10
[58] Field of Search ................... 137/312; 92/98 D; 251/335 R, 335 A, 335 B, 63, 63.5, 63.6

[56] References Cited
UNITED STATES PATENTS

| | | | |
|---|---|---|---|
| 2,675,204 | 4/1954 | Johnson | 251/335 A X |
| 3,290,003 | 12/1966 | Kessler | 251/63.6 X |
| 3,499,456 | 3/1970 | Rerecich et al. | 251/63.5 X |

FOREIGN PATENTS OR APPLICATIONS 941,421  11/1963  Great Britain ................. 251/335 A Primary Examiner—William R. Cline
Assistant Examiner—Richard Gerard
Attorney, Agent, or Firm—Dawson, Tilton, Fallon & Lungmus

[57] ABSTRACT

A valve for regulating liquid flow under conditions inhibiting contamination wherein the actuator portion of the valve is isolated from the work portion of the valve by a unique seal and diaphragm arrangement, and wherein any leakage is immediately detectable.

1 Claim, 2 Drawing Figures

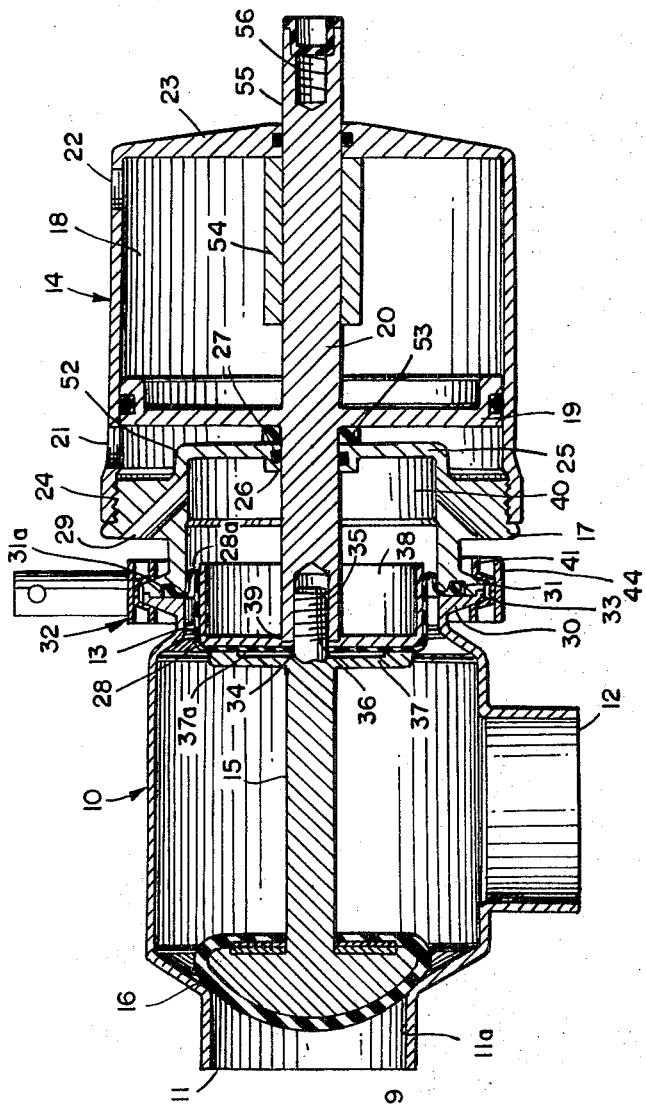

VALVE WITH LEAK DETECTING SEAL AND DIAPHRAGM ASSEMBLY

BACKGROUND AND SUMMARY OF INVENTION

This invention constitutes an improvement over U.S. Pat. No. 3,052,444. In particular, the instant invention relates to a valve for regulating liquid flow under conditions inhibiting contamination. Such valves are used widely in the dairy industry where the inhibition of contamination is mandatory. Valves according to the invention are advantageously used in the filler lines of dairies, i.e., to control the flow of milk to the filler bowl. It will be appreciated that the valve is adapted for a wide variety of flow controls — whether of the on-off type or of the throttling type, and for a variety of liquids, viz., milk, cream, juices, etc. The problem that has existed is that the compressed air used to actuate the valve has, on occasion, entered the product, and thus can carry contaminants. Also, the prior art valves were difficult to clean — in many instances requiring a number of cyclings of the valve operator in order to achieve proper cleanability.

Through the use of a unique structure between the control portions of the valve and the actuator portions, a valve which meets the demands of the art insofar as inhibiting contamination and being readily cleanable is provided.

DETAILED DESCRIPTION

The invention is described in conjunction with an illustrative embodiment, in which:

FIG. 1 is a longitudinal sectional view of the valve incorporating the teachings of this invention; and FIG. 2 is an end elevational view of the valve of FIG. 1.

Referring now to the drawing, the numeral 10 designates generally a valve body which is seen to be equipped with ports 11 and 12. The valve body is equipped with an additional opening 13 which is disposed opposite the port 11, and which serves as a means for connecting the valve body 10 to the actuating means generally designated 14. The actuating mechanism 14 includes a stem 15 equipped at one end with an enlargement as at 16 for the purpose of closing the port 11. It will be appreciated that the port 11 provides a valve seat for confrontation with the enlargement 16. By virtue of altering the character of the port 11, the valve pictured may be converted from the throttling type shown to the on-off variety. In the latter case, the port 11 is enlarged somewhat so that the entire enlargement can be moved into the more constricted portion 11a of the port 11.

The actuator means 14 includes an actuator body 16 which is coupled by means of a guide bearing 17 to the valve body 10. The actuator body 14 provides a cylindrical bore 18 in which a piston 19 is slidably mounted. It will be seen that the piston 19 is equipped with an integral rod 20 which, at its lefthand end (as shown), is coupled to the stem 15. The actuator body 14 is equipped with a pair of pressure fluid ports or openings as at 21 and 22 which are located on opposite sides of the piston 19. Thus, coupling the port 21 to a source of compressed air will move the piston 19 to the right and remove the valve enlargement 16 from its engagement with the seat provided as part of the port 11 — thereby allowing liquid to flow into port 11 through the valve body 10 and out of the port 12. As compressed air enters through the port 21, air exits from the right side of the piston 19 through the port 22. Reversal of the connection of ports 21 and 22 to the source of compressed air results in opposite movement of the piston 19 — to a position closing the port 11.

The guide bearing 17 provides a closure for the actuator body 16. It will be noted that the actuator body 16 is essentially cup-shaped, being defined by a cylindrical side wall integral with an end wall 23. The open end of the cup shape is threaded as at 24, and engages mating threads on the guide bearing. The guide bearing also is generaly cup-shaped, having a cylindrical side wall closed at one end by an integral end wall 25. Centrally of the end wall 25 is provided an aperture 26 through which a portion of the rod 20 extends. The end wall 25 of the guide bearing 17 is enlarged about the aperture 26, and provides a mounting for an O-ring 27. The O-ring 27 effects a seal with respect to the rod 20, preventing the passage of compressed air toward the valve body. A further barrier in the form of a diaphragm 28 (to be described hereinafter) is also interposed in the path of possible flow of contaminant from the actuator body 16 to the valve body 10.

Communicating the atmosphere with the hollow interior of the guide bearing 17 are a plurality of passages 29 (see also FIG. 2). Thus, any compressed air moving to the left in FIG. 1 and past the O-ring seal 27 will exhaust to atmosphere and not penetrate the liquid whose flow is being controlled by the valve.

The guide bearing 17 is clamped to the valve body 10, and this arrangement promotes ready cleanability. For the purpose of clamping the elements 10 and 17 together, each is equipped with a flange adapted to be arranged in confronting relation as seen in FIG. 1. Referring to the central lower portion of FIG. 1, it will be seen that the valve body 10 is equipped with an annular flange 30 which faces the opposite direction from the inlet port 11. In cooperative fashion, the guide bearing 17 is equipped with an annular flange 31. These flanges or ferrules are clamped together by a clamping device generally designated 32. It will be noted that the flange 30 is equipped with an axially extending lip 33 which mates with a corresponding recess in the flange 31 of the guide bearing 17. Clamped between the confronting surfaces of the flanges 30 and 31 is the perimeter of the diaphragm 28.

The diaphragm 28 is equipped with a central aperture 34 and the annular portion of the diaphragm about the central aperture 34 is clamped to both the stem 15 and rod 20.

For this purpose, the rod 20 is equipped with an axially extending threaded bore 35 into which is received a constricted axially extending threaded end portion 36 of the stem 15.

The stem 15 is seen to be equipped with an integral plate-like flange 37 adjacent the end thereof opposite the end equipped with the enlargement 16. The plate-like flange 37 is provided at the point where the stem 15 becomes constricted so as to provide the threaded part 36. The flange 37 cooperates with a cup 38 to clamp the central portion of the diaphragm 28. The cup member 38 is recessed at 39 to accommodate the lefthand end of the piston rod 20. Thus, tightening the threaded engagement of the stem part 36 into the threaded recess 35 of the stem 20 causes the plate-like flange 37 to force the diaphragm against the cup member 38. It will be noted that the plate-like flange 37 is equipped with a recess 37a in the central portion confronting the cup member 38 so that the clamping effected on the diaphragm 28 is essentially adjacent the circular perimeter of the flange 37.

Thus, the diaphragm 28 serves as a seal preventing the flow of liquid into the chamber 40 of the guide bearing. Should any liquid penetrate the diaphragm 28, its presence will be readily noted by virtue of leakage out of the ports 29.

The perimeter of the diaphragm is sealingly clamped in place by the flanges 30 and 31, the flange 31 being annularly recessed as at 31a to accommodate a perimetric bead or enlargement on the diaphragm 28.

The clamping of the flanges 30 and 31 is achieved by the cooperation therewith of a plurality of V-shaped inserts 41-43 and a perimetric band 44. As seen in FIG. 2, the three V-shaped inserts 41–43 extend slightly less than 120 degrees about the flanges 31 and 32. These V-shaped inserts are urged or tightened by means of the perimetric band 44. The two ends of the band 44 and looped as at 45 and 46 which are positioned, respectively, about posts 47 and 48 provided as part of the clamping means 32. The post 47 is provided as part of a nut body 49 which is equipped with a threaded longitudinal bore into which is threaded the extension 50 of the portion carrying the post 48. Thus, upon turning the handle 51, the posts 47 and 48 are drawn together, tightening the clamping means 32.

It will be appreciated that ready cleanability is facilitated through the structure just described because all that is required to disengage the valve body 10 from the guide bearing 17 is to loosen the clamping means 32. This permits removal of the valve body 10 from its engagement with the stem 15 and enlargement 16 so as to permit washing, sterilization, or the like. Also, the portions of the valve stem which contact the milk are now exposed for quick and thorough cleaning. It will be appreciated that it is usually unnecessary to work on the valve in the compressed air side, viz., that portion to the right of the O-ring seal 27. Thus, removing the clamping means 32 not only frees the valve body 10 but unclamps the perimeter of the diaphragm 28 so that this also can be serviced. To completely remove the diaphragm, it is only necessary to unthread the stem 15 from the rod 20. When reassembling the components, the recess 37a provides a relief to accommodate a possibly oversize diaphragm.

It will be noted that in the fully closed position of the valve, as depicted in FIG. 1, the diaphragm 28 is supported by the cup member 38. In other words, the skirt or cylindrical wall of the cup member 38 is of sufficient depth (in the direction of valve movement) so as to overlap the reverse annular fold in the diaphragm 28 as at 28a. This prevents pressure from the fluid from folding the diaphragm over the base of the cup member so as to possibly stretch or burst the same. Also, this minimizes wear or dragging on the diaphragm — it being appreciated that as the valve stem 15 moves to the right in FIG. 1, the cylindrical wall of the cup member 38 emerges from its overlapped relationship with the diaphragm so as to always provide the aforementioned desirable support.

It will be seen by referring to the central portion of FIG. 1 that the guide bearing 17 is stepped or shouldered to provide an offset 52. This permits the use of a generous sized port 21 for the introduction of pressure fluid on the left side of the piston 19. Also provided is a bumper 53 and a stop collar 54 which are concentric with the piston rod 20 so as to limit the stroke thereof in opposite directions. Although the actuator portion of the valve as depicted in FIG. 1 is arranged for compressed air actuation in both directions, the valve is readily convertible to a spring return type of operation. For example, a spring can be installed in the portion of the cylinder 18 to the right of piston 19 so as to provide a spring closed operation. In such a case where the compressed air fails, the valve will automatically close. To install the spring, use is made of the extension 55 of the rod 20. After the spring is inserted between the piston 19 and the end wall 23, a tool can be threaded into the axial threaded bore 56 so as to draw the piston 19 toward the wall 23 and temporarily compress the spring. Thereafter, the actuator body 14 is threadedly mounted on the guide bearing 17, after which the spring-compressing tool is removed from the bore 56. In like fashion, the threaded bore 35 can be used for the springcompressing function when the spring is intended to be installed in that portion of the cylinder 18 to the left of the piston 19, The extension 55 of the rod 20 also serves a further advantageous purpose in indicating the position of the valve without the need for other devices.

In the operation of the valve shown, compressed air introduced into the port 21 moves the piston 19 to the right, thereby simultaneously moving the valve head or enlargement 16 away from its seat on the port 11. This permits flow of milk or other liquid whose flow is to be controlled to enter the valve body 10 and exit through the port 12. During this movement of the valve stem 15 (and piston rod 20) to the right, the diaphragm 28 is at all times supported against stretching and possible abrasion resulting in bursting by virtue of the cylindrical side wall of the cup member 38. The extension 55 of the rod 20 gives a clear and quick indication to any operator as to the position of the valve head 16.

By coupling the port 22 to a source of compressed air, the piston 19 is forced to the left and effects a closing or throttling (as desired) of the liquid flow. The compressed air is completely isolated from the liquid flow by virtue of two separate sealing systems. The compressed air is isolated to the right of the O-ring seal 27, while the liquid flow is isolated to the left of the diaphragm 28. Should either of these fluids penetrate to the chamber 40 provided in the guide bearing 17, the presence thereof will be immediately known because of the detector ports 29 communicating the chamber 40 with the atmosphere.

For cleaning, which is an important function in a valve used in a dairy operation (milkstone building up rapidly), it is only necessary to release the clamping mechanism 32 — as by turning the handle 51. This releases the engagement of the flanges 30 and 31 of the valve body 10 and guide bearing 17 respectively. In so doing, the perimeter of the diaphragm 28 is also released, so that all of the elements used to confine liquid flow are immediately available for cleaning and other servicing.

While in the foregoing specification a detailed description of an embodiment of the invention is set down for te purpose of illustration, many variations in the details herein given may be made by those skilled in the art without departing from the spirit and scope of the invention.

I claim:

1. A readily cleanable valve for regulating milk or like liquid flow under conditions inhibiting contamination comprising
   a valve body equipped with at least two ports, one of said ports providing a valve seat, said valve body having an opening opposite said one port,
   a guide bearing clamped to said valve body and having an end wall remote from said valve body for closing said opening and being in alignment with said one port,
   said guide bearing having an actuator body coupled thereto on the side thereof remote from said valve body,
   a piston mounted in said actuator body and having rod means extending through an opening in said guide bearing end wall into said valve body, said rod means being equipped with a valve head for engagement with said seat,
   said actuator body being equipped with port means for applying fluid pressure to said piston,
   an O-ring seal interposed between said guide bearing end wall opening and said rod means,
   a circular apertured diaphragm connected about said aperture to said rod means at a point thereon between said head and the point of contact of said O-ring, the perimeter of said diaphragm being clamped between said valve body and said guide bearing to constitute a second seal whereby liquid in said valve body is isolated from fluid in said actuator body by seals arranged in series,
   a cup member mounted on said rod means adjacent the connection of said diaphragm to said rod means, said cup member having a cylindrical wall extending beyond the clamping of the diaphragm perimeter between said valve body and guide bearing whereby said cup member provides continuous support during folding and unfolding of said diaphragm,
   each of said valve body and guide bearing being equipped with an annular flange for confronting engagement and for clamping said diaphragm perimeter therebetween,
   said guide bearing being equipped with leak-detect port means communicating the interior of said guide bearing between said O-ring and diaphragm with the atmosphere, and
   quick disconnect clamp means perimetrically arranged about said flanges whereby disconnecting said clamp means permits quick removal of said valve body to expose for cleaning all portions of said valve contacted by liquid.

* * * * *